Patented Aug. 27, 1940

2,212,566

UNITED STATES PATENT OFFICE 2,212,566

CASEIN PAINT AND METHOD OF PREPARING THE SAME

Walter B. Kinney, Bainbridge, N. Y., assignor, by mesne assignments, to The Borden Company, New York, N. Y., a corporation of New Jersey No Drawing. Application May 4, 1937, Serial No. 140,603

18 Claims. (Cl. 134—50)

This invention relates to casein paints and a method of making the same. It is desirable to prepare paints in which casein is used as a binding or adhesive agent in commercially dry form so that they may be easily packaged, stored, and mixed with water as required for use. In fact, if such paints are not dry and contain materials such as lime, they will not keep for an extended period of time without decomposition of the protein or the formation of an irreversible gel. When lime or similar materials are used in casein paints, therefore, it is practically essential that the paints be prepared for use in a commercially dry form. It is also desirable, though, to prepare casein paints in dry form which do not contain lime, but which may be quickly and easily mixed with cold water for use.

There is a pronounced tendency for ordinary dry casein paints, either with or without lime, to lump when mixed with cold water and the preparation of the paints for use requires a relatively long time. The casein in such dry casein paints is present as individual hard particles of casein which swell when the paint is mixed with water. These partially solubilized swollen particles should be thoroughly solubilized before the paint is used, a process frequently requiring several hours of constant stirring. In addition, the spreading and covering properties of such paints are not as good as is desired even after the casein particles have been substantially solubilized.

One object of my invention is the provision of dry casein paint substantially free from these objectionable qualities upon mixing with cold water.

A further object of my invention is to provide a dry casein paint which may be mixed with cold water and applied immediately, but which may be kept mixed with water for several days prior to use if desired.

Another object of my invention is to provide dry casein paint and a method of making the same which has improved painting qualities, a pleasing odor, and has very good weathering conditions.

In accordance with my invention, a dry material which may be used itself as a paint, or as a paint base for admixture with other paint ingredients, is prepared by incorporating solubilized casein with a quantity of pigment in the presence of a liquid medium, such as water, drying and finely dividing the "base" thus obtained. By the term "solubilize" as used herein, I mean the rendering of the casein soluble to the extent that it produces a uniform dispersion in water as is understood in the art. The casein in this dry, finely divided base is capable of quickly becoming dispersed when mixed with water to give a free flowing, smooth paint of very high quality. The treated casein is much more uniformly and thoroughly distributed throughout the paint base than is ordinarily the case where the casein is merely physically mixed with the pigment either dry or in the presence of water without being solubilized. This paint base, or a material obtained by mixing lime and/or other ingredients therewith, is greatly superior in general to dry casein cold water paints heretofore known. Among other advantages, dry casein paints in accordance with my invention have improved spreading and covering qualities, do not leave brush marks, have less tendency to settle when left for a period of time, are non-yellowing, have a pleasing odor and are quick drying. Finely divided hydrated lime or other modifying or addition agents may be readily mixed therewith, if desired.

My invention will be more particularly described with reference to certain specific embodiments thereof.

The desired pigment base, in a finely divided condition, may be mixed with a suitable amount of casein and these materials thoroughly mixed together dry. The amount of the casein may be varied over a wide range, although I prefer to employ about 10–15% casein based on the weight of pigment, when all of the pigment is to be incorporated initially. Any suitable pigment or mixture of pigments may be employed for this purpose, such as titanium white, clay, talc, or the like, or various coloring materials may be added thereto or substituted for part of the pigment to provide the desired shade of color in the paint. The pigment or pigment material employed is preferably chemically inert with respect to the other ingredients used in making up the paint base.

Water containing sufficient soluble alkaline casein solvent to solubilize the casein may then be added to the mixture of pigment and casein. For this purpose, sufficient water to produce a pasty consistency and ensure a complete action of the alkaline material on the casein should be used. Too much water, however, may unduly prolong the subsequent drying of the material. This dilute alkaline solution may be poured on to the casein pigment mixture while the latter is being agitated. Heating of the mass may be employed to speed up the action of the alkaline agent on the casein. The alkaline solution may be added to the material during the heating and the heating is preferably continued until the casein has been substantially dissolved. Heating of the mass at a temperature around 140–150° F. while the alkaline solution is being added and maintaining the mass at this temperature until the casein is dissolved has been found satisfactory, although the particular temperature employed is not critical. The resulting mass, which will be referred to as "paint base," is then allowed to cool or may be artificially cooled when it becomes a heavy, crumbly mass. This mass is separated into particles of a size convenient for placing on drying screens or other surfaces for forced or natural drying. It is not necessary to dry the particles immediately, but the mass may be left for several days before breaking it up and drying it. This drying may be carried out at an elevated temperature or at room temperature, as desired. The dried particles may then be comminuted in any suitable manner.

If desired, the casein may be mixed with the amount of water and solvent and solubilized prior to mixing with the pigment. In fact, if any pigment is employed which is not entirely chemically inert, it may be preferable to solubilize the casein in advance and to mix the wet solubilized casein with the pigment, rather than to solubilize the casein after it has been mixed with the pigment.

The uniformly finely divided dry paint base material may be applied directly as a paint after mixing with cold water, or may be mixed with finely divided hydrated lime, potassium dichromate or other modifying agents or addition agents prior to use.

All of the pigment or only a part of the pigment may be employed in making up the paint base. If only a portion of the pigment is used, the balance of the pigment may be subsequently mixed or ground with the dried paint base. Mixing only a portion of the pigment with the solubilized casein is advantageous in that less water is required to obtain an intimate mixture and consequently the mass may be dried more quickly after mixing. I prefer to employ at least half of the total quantity of pigment for the ultimate paint in making the paint base. In general, the more of the pigment which is incorporated with the solubilized casein in making the paint base and the less pigment physically mixed with this paint base afterwards, the better the painting qualities of the final product will be.

When a number of colored paints are to be made, frequent cleaning of equipment can be avoided by making a paint base with a white pigment or mixture thereof and mixing or grinding the coloring materials with this white base to provide quantities of paint of different colors. Various shades of paint may also be made by making two or more white paint bases of different casein content and subsequently blending proper quantities of these different bases with a desired amount of color to produce a paint having a suitable casein content and the desired shade of color.

By way of illustration, two paint bases may be made with white pigment in accordance with my invention, base number one containing about 17% casein and base number two containing about 14% casein. These paint bases may be used, for example, to make up differently colored paints each containing lime and about 12% casein. If a deeply colored paint is desired, base number one may be used, or if only a light shade is desired, base number two may be employed. Intermediate shades can be readily obtained by appropriate mixtures of the two bases with the other ingredients. The following examples illustrate some of the possible variations to obtain a series of paints of different shades each containing 12% of casein.

Table 1

|  | Deep shade | Light shade | Intermediate |
| --- | --- | --- | --- |
|  | Parts | Parts | Parts |
| Base No. 1 | 80.5 |  | 45.15 |
| Base No. 2 |  | 98.63 | 45.6 |
| Coloring matter | 19.5 | 1.37 | 10.25 |
| Hydrated lime | 10 | 10 | 10 |

The dry paint base, either with or without lime or other ingredients, may be kept for long periods of time without deteriorating and readily and quickly mixes with cold water to provide a paint of the desired consistency ready for immediate use. If lime is employed in the paint, the other materials used, including coloring materials, pigment base, and the like are preferably substantially lime proof so that the color of the paint and its texture will not be effected upon standing or after application. Ammonium hydroxide is one water soluble alkaline material which is especially suitable for use in the preparation of the paint base, although other similar water soluble alkaline casein solvent materials may be employed for this purpose, such as tripotassium phosphate, sodium borate, trisodium phosphate, disodium phosphate, caustic soda, potassium hydroxide, sodium aluminate, and sodium potassium, and ammonium carbonates. Casein solvent materials such as lime are not satisfactory for this purpose because of gel formation, although they may be mixed dry with the resultant dry product.

Additional solvent materials may be added in a dry state to the prepared paint base to assist or further the dissolving of the casein when the paint is mixed with water. Other materials than hydrated lime may be substituted in part or in whole for the hydrated lime to serve as solubilizing agents and/or water-proofing agents for the casein of the paint.

A small quantity of a foam reducing agent, such as pine oil, or the like, may be employed, if desired, in making up the paint base. The addition of a foam reducing agent to the casein and pigment used in making the paint base or to the final product is helpful in obtaining a smoother, higher quality paint, but is not necessary to obtain a paint having superior mixing and covering properties.

By way of further illustration, an example of the preparation of a casein paint in accordance with my invention is given. It is to be understood that the invention in its broader aspects is distinctly not limited thereto.

About 14.6 pounds of pigment, for example a mixture of titanium dioxide, clay, and talc, together with about 2 pounds of dry ground acid precipitated casein are placed in a mixer provided with a heating jacket. This mixture is stirred for a short time while being heated to a temperature of about 150° F. About 0.4 pound of pine oil is then added to the mass and thoroughly incorporated therein. A solution of about 0.125 pound of commercial 26° Bé. ammonium hydroxide in about 5 pounds of water is poured into the mixer and heating and mixing are continued for about 30 minutes. The alkaline solution may be either cold or heated when added but is preferably cold when a volatile alkaline solubilizing agent, such as ammonia, is employed. The casein has now become solubilized and thoroughly mixed with the other ingredients. The mass is then artificially cooled or allowed to cool naturally, separated into small pieces and dried. The dried pieces are finely ground to provide the paint base.

In order to provide a paint having good weather resistance, I prefer to mix this ground paint base with a quantity of finely divided hydrated lime. This may be accomplished by mixing about 87 parts of the ground paint base with about 13 parts of the lime in a spiral mixer or other device until the two are thoroughly mixed. The mixture is then ready for mixing with water for use, or for packaging and storage. In the dry form, this paint keeps exceedingly well without deterioration. When mixed with cold water, the paint is ready for use in five or ten minutes and readily produces a smooth water resistant paint film free from brush marks and other imperfections. In addition, this paint, after mixing with water, remains in a better spreadable condition for a much longer time than other casein paints containing lime but not prepared in accordance with my invention.

I attribute the beneficial qualities of a paint prepared in accordance with my invention not only to the fact that the casein material in the paint has been chemically changed to a more soluble form, but also to the fact that the solubilized casein when dried, surrounds and substantially encases particles of pigment, thus providing a smoother product and a greater area of casein exposed to solvent action when the dry paint is mixed with water.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a process of preparing a dry paint, the steps of wet mixing a paint pigment with a solution of casein and drying the mixture.

2. In a process of preparing a dry paint, the steps of wet mixing a paint pigment with a solution of casein, drying the mixture, and grinding the dried product.

3. A process of preparing casein paint comprising intimately mixing finely divided paint pigment with casein and casein solvent including an alkali, and sufficient water to ensure complete action of said alkali, and drying the mixture.

4. A process of preparing dry, cold water casein paint comprising incorporating finely divided paint pigment with about 10 to 20% of casein, and a sufficient quantity of water and a water soluble alkaline casein solvent to completely dissolve said casein, and drying the mixture to provide pigment particles coated with soluble casein.

5. A process of making dry casein paint comprising mixing finely divided paint pigment with finely divided acid precipitated casein, treating said mixture with a dilute solution of ammonia to dissolve the casein in the presence of said pigment, drying the mixture, and comminuting the dried product.

6. In a process of preparing a dry paint, the steps of wet mixing a paint pigment with a solution of casein, drying the mixture, comminuting the dried mixture, and incorporating finely divided hydrated lime therewith.

7. A process of making a dry casein paint comprising mixing thoroughly and heating finely divided paint pigment with water, a foam reducing agent, a water soluble casein solvent, and about 10% to about 20% of casein until said casein is substantially completely dissolved, cooling and drying the mixture, comminuting the dried product, and mixing finely divided hydrated lime therewith.

8. A process of preparing a casein paint comprising mixing substantially dry finely divided casein with finely divided paint pigment, treating the mixture with a water solution of a casein solubilizing agent to substantially completely dissolve the casein, drying the mixture, and comminuting the dried product.

9. Dry casein paint containing finely divided particles of paint pigment coated with soluble casein.

10. Dry casein paint containing finely divided particles of paint pigment coated with soluble casein and discrete particles of finely divided hydrated lime.

11. A process of making dry casein paint comprising preparing a paint base by incorporating white pigment with a solution of casein and drying the mixture, preparing a second dry paint base containing a different proportion of casein, and blending said paint bases with coloring matter to obtain a casein paint of the desired shade of color and casein content.

12. A process of making a dry casein paint comprising heating and agitating a mixture of pasty consistency including finely divided paint pigment, water, casein and a water soluble casein solvent until said casein is substantially completely dissolved, cooling and drying the mixture, comminuting the dried product and mixing dry, finely divided hydrated lime therewith.

13. A process of manufacturing a dry casein paint comprising agitating a mixture of pasty consistency including finely divided paint pigment, water, casein and a water soluble casein solvent until said casein is substantially completely dissolved, drying said mixture, comminuting the dried product, and mixing dry finely divided hydrated lime therewith.

14. A process of preparing dry, cold water casein paint comprising intimately mixing finely divided paint pigment with a smaller quantity of casein and sufficient water and water soluble casein solvent to substantially completely dissolve said casein, drying the mixture to provide pigment particles coated with soluble casein, and grinding said product.

15. A process of preparing dry, cold water casein paint comprising intimately mixing finely divided paint pigment with a smaller quantity of casein and sufficient water and water soluble casein solvent to completely dissolve said casein, allowing said casein to become dissolved, drying the mixture, grinding the dried product, and mixing therewith a small quantity of finely divided hydrated lime.

16. A process of preparing dry, cold water casein paint comprising substantially completely dissolving casein in a solution of alkaline casein solvent, thereafter intimately mixing paint pigment into said casein solution, and drying the resulting product to retain said casein in a water soluble condition.

17. A dry powdered casein paint capable of being mixed with cold water to provide immediately a smooth, spreadable free-flowing paint, said dry paint being relatively free from discrete particles of solid casein and containing finely divided particles of paint pigment coated with readily soluble casein.

18. Dry cold water casein paint consisting principally of finely divided particles of paint pigment coated with soluble casein, said coated pigment particles being readily wetted by cold water to provide quickly a uniform distribution of dissolved casein and pigment throughout the paint.

WALTER B. KINNEY.